United States Patent
Kunc et al.

(10) Patent No.: US 8,653,943 B2
(45) Date of Patent: Feb. 18, 2014

(54) RADIO FREQUENCY IDENTIFICATION SYSTEM PROVIDED FOR ACCESS CONTROL

(75) Inventors: Vinko Kunc, Ljubljana (SI); Andrei Vodopivec, Ljubljana (SI)

(73) Assignee: IDS Microchip AG, Wollerau (CH)

( * ) Notice: Subject to any disclaimer, the term of this patent is extended or adjusted under 35 U.S.C. 154(b) by 527 days.

(21) Appl. No.: 12/452,807

(22) PCT Filed: Jul. 22, 2008

(86) PCT No.: PCT/SI2008/000044
§ 371 (c)(1),
(2), (4) Date: Apr. 19, 2010

(87) PCT Pub. No.: WO2009/014503
PCT Pub. Date: Jan. 29, 2009

(65) Prior Publication Data
US 2010/0194534 A1   Aug. 5, 2010

(30) Foreign Application Priority Data
Jul. 24, 2007  (SI) .................................. P-200700189

(51) Int. Cl.
*H04Q 5/22* (2006.01)
*G05B 23/02* (2006.01)
*H04Q 1/30* (2006.01)

(52) U.S. Cl.
USPC ... 340/10.1; 340/10.2; 340/10.34; 340/10.42; 340/10.3; 340/3.21; 340/7.38

(58) Field of Classification Search
USPC ....................................................... 340/10.1
See application file for complete search history.

(56) References Cited

U.S. PATENT DOCUMENTS 5,347,263 A *  9/1994  Carroll et al. ................ 340/5.61
6,282,407 B1 *  8/2001  Vega et al. ................... 455/41.1

(Continued)

FOREIGN PATENT DOCUMENTS

| EP | 1 240 034 | 7/2003 |
|----|-----------|--------|
| WO | WO 00/41333 | 7/2000 |
| WO | WO 01/43999 A1 | 6/2001 |

*Primary Examiner* — Daniel Wu
*Assistant Examiner* — Muhammad Adnan
(74) *Attorney, Agent, or Firm* — McDermott Will & Emery LLP

(57) ABSTRACT

An interrogator (Interrog) is additionally provided with a logic circuit (ActCommProt-ImplLCI) for implementing an active communication protocol and with a receiving second antenna (AI2) provided for an active communication. Said antenna is connected through an active receiver (AMActRecI) for receiving amplitude-modulated signals to said logic circuit (ActCommProtImplLCI). A transmitting and receiving first antenna (AT1) in each transponder (Transp) is connected through an active receiver (AM-ActRecT) for receiving amplitude-modulated signals to a logic circuit (ActCommProt-ImplLCT) for implementing the active communication protocol, an output signal of which logic circuit is conducted through an active transmitter (AMActTransmT) for transmitting amplitude-modulated signals to a transmitting second antenna (AT2) for active communication. The transponder (Transp) is provided with a power supply circuit (SupplC). The passive communication protocol is a protocol according to standard ISO 15693 and the active communication protocol is similar thereto. Checking by means of the radio frequency identification system of the invention for access control can be carried out in a way comfortable for the user also at a distance from the interrogator somewhat exceeding one meter, whereas the transponder with a battery run-down has to be brought closer to the interrogator to a short distance usual till now.

29 Claims, 3 Drawing Sheets

(56) References Cited

U.S. PATENT DOCUMENTS

| | | |
|---|---|---|
| 6,323,566 B1 * | 11/2001 | Meier ........................... 307/10.2 |
| 6,922,134 B1 * | 7/2005 | Yones ......................... 340/10.51 |
| 2005/0134459 A1 * | 6/2005 | Glick et al. ................ 340/572.1 |
| 2007/0117623 A1 * | 5/2007 | Nelson et al. ................... 463/29 |
| 2008/0132167 A1 * | 6/2008 | Bent et al. .................... 455/41.2 |
| 2010/0093429 A1 * | 4/2010 | Mattice et al. ................. 463/25 |
| 2010/0265068 A1 * | 10/2010 | Brackmann et al. ....... 340/572.1 |

* cited by examiner

RADIO FREQUENCY IDENTIFICATION SYSTEM PROVIDED FOR ACCESS CONTROL

CROSS-REFERENCE TO RELATED APPLICATIONS

This is a national stage of PCT/SI08/000,044 filed Jul. 22, 2008 and published in English, which has a priority of Slovenian no. P-200700189 filed Jul. 24, 2007, hereby incorporated by reference.

BACKGROUND OF THE INVENTION (1) Field of Invention

The invention relates to a radio frequency identification system provided to control access to rooms, objects or to workstations and comprises an interrogator, at least one transponder and a protocol according to standard ISO 15693 for passive communication between the interrogator and the transponders, in the sense that control may be performed even if a working distance of an interrogator lying just beyond one meter.

(2) Description of the Related Art

A control over access to rooms, objects or workstations like computers is most usually implemented in a contactless way by means of radio frequency identification (RFID) technology.

The RFID system consists of an interrogator, at least one transponder and a protocol for communication between the interrogator and the transponders. The interrogator is placed at the access point to the controlled object and users authorized to access have suitable transponders.

Communication in most RFID systems is carried out at a frequency of 13,56 MHz according to the protocol subjected to standard ISO 15693. A working distance between the interrogator and the transponder lies below 70 centimeters, usually ranging from 10 centimeters to 40 centimeters only. The transponder receives a strong enough supply flow of the magnetic field energy originating from the interrogator just at such short working distance therefrom. The reason for such short working distance is a low sensitivity of the receiving part of the interrogator. Therefore, the user must bring the transponder closer to the interrogator to the mentioned short distance. However, this is not comfortable and the users need to stop at the interrogator.

Actually, RFID systems with communication according to the protocol subjected to standard ISO 15693 are also known, in which systems the transponders are provided with a battery. Yet just additional functions are made possible like additional sensors and recording the presence of the interrogator field.

A radio frequency identification system of this kind is described in Klaus Finkenzeller, RFID Handbook, John Wiley and Sons Ltd., 2003 (pages 275 and 312) and is schematically represented in FIG. 1. It comprises an interrogator Interrog, at least one transponder Transp and a protocol subjected to standard ISO 15693 for the communication between the interrogator Interrog and the transponders Transp, which communication is passive in the direction from each transponder Transp towards the interrogator Interrog. The transponder Transp is not provided with an energy source and therefore communicates with the interrogator Interrog in a passive way in that a transponder rectifier Rect and a transponder clock extractor ClExtr get power and a clock signal needed for the functioning of the transponder Transp out from electric current being generated by the voltage, which the magnetic field BItransm generated by an interrogator antenna AI induces in a transponder antenna AT. The interrogator antenna AI then detects an impedance variation due to modulation carried out in the transponder Transp and transmitted to its surroundings by the transponder antenna AT.

The interrogator Interrog comprises a data interface DatInterf, which on the one hand provides for a data connection to a system level and on the other hand exchanges data with an interrogator logic circuit PassCommProtImplLCI to implement the passive communication protocol. The interrogator logic circuit PassCommProtImplLCI for implementing the passive communication protocol transmits a signal to an interrogator amplitude modulator AMI, to whose second input an output signal of a high-frequency signal generator HFGen is conducted. An output signal of the interrogator amplitude modulator AMI as a signal to be transmitted is conducted through an antenna matching transformer AMatchTransf to the transmitting and receiving interrogator antenna AI.

In the mentioned way, the transmitting and receiving interrogator antenna AI receives the magnetic field BIrec modulated by the transponder antenna AT and generates a received signal, which is conducted through the antenna matching transformer AMatchTransf and an interrogator amplitude demodulator ADemI to the interrogator logic circuit PassCommProtImplLCI to implement the passive communication protocol.

On the one hand the transmitting and receiving transponder antenna AT is connected through a transponder amplitude demodulator ADemT to a transponder logic circuit PassCommProtImplLCT to implement the passive communication protocol. Said circuit exchanges data with a memory device Mem. On the other hand a signal to be transmitted by the transponder is conducted from the transponder logic circuit Pass-CommProtImplLCT to implement the passive communication protocol through a transponder amplitude modulator AMT to the transmitting and receiving transponder antenna AT.

According to the protocol for the "passive" communication between the interrogator Interrog and the transponders Transp, the interrogator Interrog turns on its high-frequency signal generator HFGen and the transmitting and receiving interrogator antenna AI starts generating the magnetic field BItransm having a constant frequency. After a time interval $\Delta t$ of at least 1 milliseconds over, the interrogator Interrog transmits an inventory request InvReq that the transponders Transp shall present themselves. Said request can be responded only by the transponders located within the interrogator working distance. Afterward each transponder Transp transmits its own unique identification code within a specified timeslot.

Moreover, a radio frequency identification system is known that operates at ultrahigh-frequency of 900 MHz or 2.4 GHz according to standard ISO 18000-6 A, B and C. A working distance for a passive transponder amounts to a few meters and is even increased if the transponder is provided with a battery. Despite the working distance being very adequate such system is not suitable to carry out access control in the vicinity of electrically partially conductive objects, a human body being as such at these frequencies as well.

A radio frequency identification system operating at a frequency of 433 MHz is also known. The interrogator and the transponder are active radio devices communicating in a digital form and according to the protocol subjected to standard ISO 18000-7, which is similar to the protocols foreseen for the RFID systems. The working distance is similar to these of low-power radio devices, i.e. about fifty meters. Such RFID system is not suitable for access control, since the working distance may not exceed three meters.

No known radio frequency identification system suitable for access control can operate at working distances within an adequate range. The adequate range of working distances for the radio frequency identification system performing access control is defined in the following way: the system must operate at a distance exceeding one meter and, due to security requirements, the working distance should not exceed three meters. Furthermore, the system should allow access even when the transponder battery is run-down, yet only at a short distance. It is desirable, however, that an improved system of this type be compatible with the existing systems of this type.

BRIEF SUMMARY OF THE INVENTION

The invention solves the technical problem how to improve a radio frequency identification system for access control to have its working distance exceeding one meter and not exceeding three meters, and to be compatible at least in its first embodiment with a radio frequency identification system, in which the communication is carried out according to the protocol subjected to the standard ISO 15693.

Said technical problem is solved by two embodiments of a radio frequency identification system of the invention for access control as described and claimed herein.

Checking by means of the radio frequency identification system of the invention for access control can be carried out in a way comfortable for the user also at a distance from the interrogator somewhat beyond one meter, whereas the transponder with a battery run-down has to be brought closer to the interrogator to a short distance usual till now.

BRIEF DESCRIPTION OF THE DRAWINGS

The invention will now be explained in more detail by way of the description of two embodiments and their variants with reference to the accompanying drawing representing in FIG. 1 is a schematic representation of a radio frequency identification System described in Klaus Finkenzeller, RFID handbook, John Wiley and Sons Ltd., 2003 (pages 275 and 312) (PRIOR ART).

DETAILED DESCRIPTION OF THE INVENTION

Figure 1:
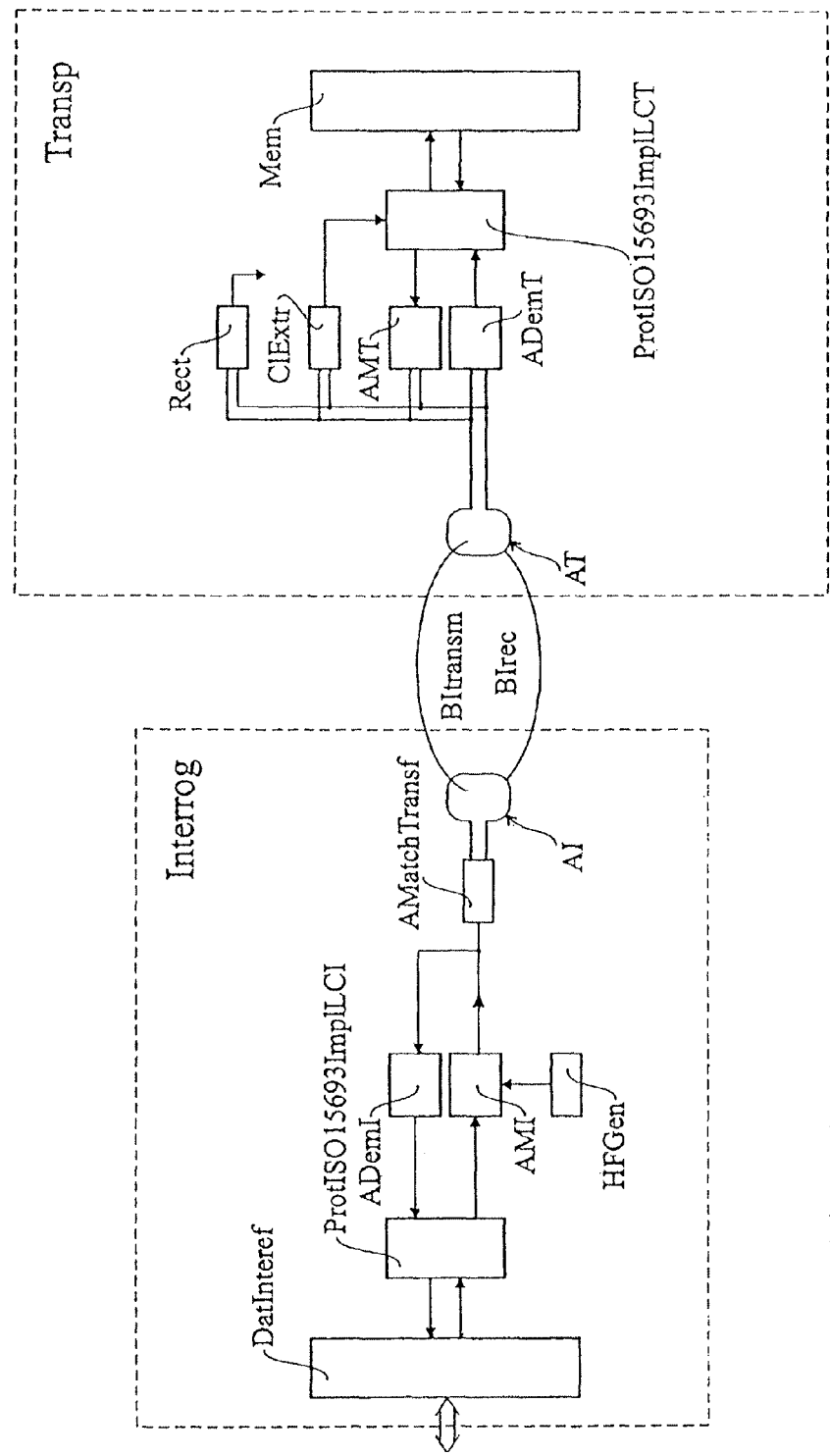
Figure 2:
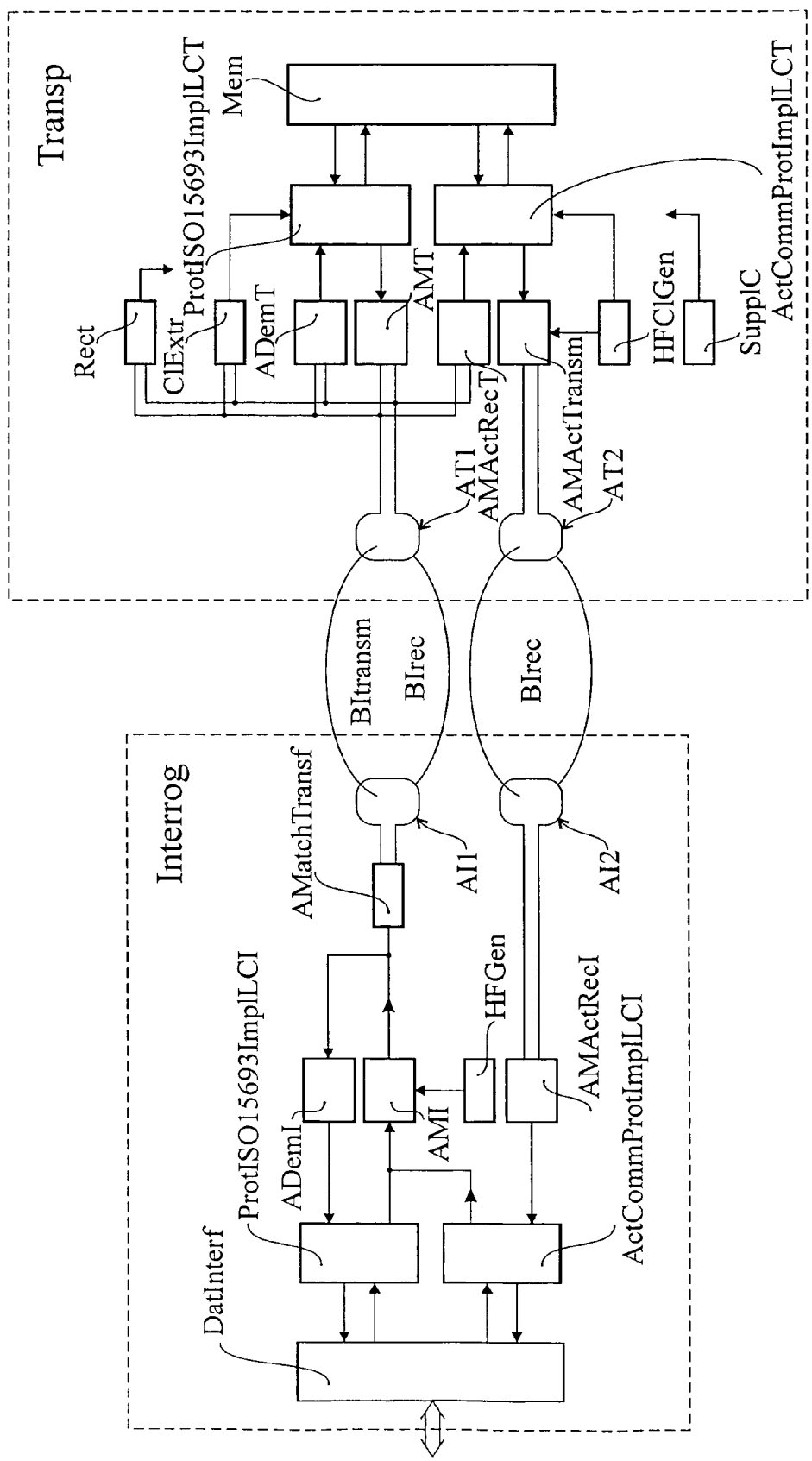
FIG. 2 the first embodiment of the radio frequency identification system of the invention for access control being compatible with known radio frequency identification systems, in which the communication is performed according to the protocol subjected to the standard ISO 15693, and FIG. 3 the second embodiment of the radio frequency identification system of the invention for access control, in which frequency modulation is used and communication is performed according to the protocol being similar to the protocol subjected to the standard ISO 15693.
Figure 3:
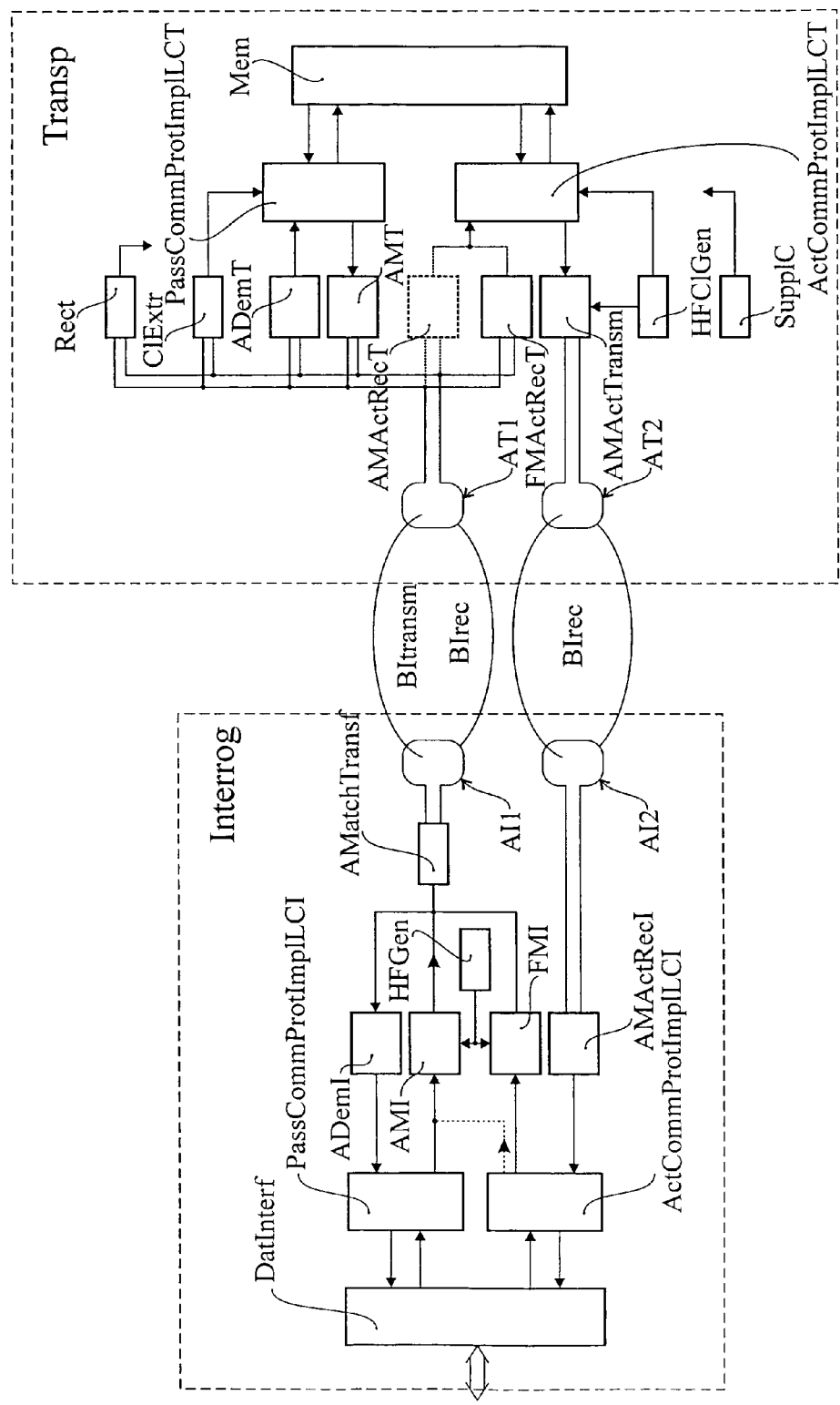

The first and the second embodiment of the radio frequency identification system of the invention for access control originate from the same known technical solution described at the beginning. Said description of the known technical solution is repeated below, in a form that, starting from it, both embodiments can be disclosed. Passive communication and active communication refer to the communication in a system between an interrogator Interrog and a transponder Transp in the case that a circuitry of the transponder Transp is energized by the energy flow of the magnetic field BItransm transmitted by the interrogator Interrog or by its own battery (FIGS. 2 and 3). The radio frequency identification system as improved by the invention combines the principle of passive communication of known RFID systems with the principle of low-power radio communication.

In the interrogator Interrog of the radio frequency identification system, a data interface DatInterf exchanges data with an interrogator logic circuit PassComm-ProtImplLCI to implement the passive communication protocol. Said logic circuit transmits a signal to an interrogator amplitude modulator AMI, to whose second input an output signal of a high-frequency signal generator HFGen is conducted and whose output signal as a signal to be transmitted is conducted through an antenna matching transformer AMatchTransf to a transmitting and receiving first interrogator antenna AI1. A signal received by said transmitting and receiving first interrogator antenna AI1 is conducted through the antenna matching transformer AMatchTransf and an interrogator amplitude demodulator ADemI to the interrogator logic circuit PassCommProtImplLCI to implement the passive communication protocol.

In the transponder Transp of the radio frequency identification system, a transmitting and receiving first transponder antenna AT1 is connected through a transponder amplitude demodulator ADemT to a transponder logic circuit PassCommProtImplLCT to implement the passive communication protocol. Said logic circuit exchanges data with a memory device Mem and transmits a signal to be transmitted by the transponder Transp through a transponder amplitude modulator AMT to the transmitting and receiving first transponder antenna AT1. The transmitting and receiving first transponder antenna AT1 is further connected to a rectifier Rect, whose output current supplies energy to transponder elements, and to a clock extractor ClExtr, which extracts a clock signal for the transponder elements out of a magnetic field BItransm transmitted by the interrogator and feeds it to the transponder elements if need may be.

The protocol for passive communication in the radio frequency identification system between the interrogator Interrog and the transponders Transp, inter alia, determines that the interrogator Interrog turns on its high-frequency signal generator HFGen in order for the transmitting and receiving first interrogator antenna AI1 to start generating the magnetic field BItransm having a constant frequency. After a time interval Δt of at least one millisecond is over, the interrogator Interrog transmits an inventory request InvReq that all transponders shall present themselves, which can be done only by transponders Transp$^{in}$ located within the interrogator passive working distance. Within a specified timeslot thereafter, each transponder Transp$^{in}$ located within the interrogator passive working distance transmits its own unique identification code.

The described known radio frequency identification system for the access control is improved by the invention in the following way to obtain the first embodiment of the radio frequency identification system of the invention (FIG. 2).

The interrogator Interrog is additionally provided with an interrogator logic circuit ActCommProtImplLCI for implementing the active communication protocol, which logic circuit exchanges data with the data interface DatInterf and transmits a signal to the interrogator amplitude modulator AMI. An output signal of the interrogator amplitude modulator AMI as a signal to be transmitted by the interrogator Interrog is conducted through the antenna matching transformer AMatchTransf to the transmitting and receiving first interrogator antenna AI1.

Further, the interrogator Interrog is additionally provided with a receiving second interrogator antenna AI2 provided for the active communication. Said antenna is connected through an interrogator active receiver AMActRecI for receiving amplitude-modulated signals to the interrogator logic circuit ActCommProtImplLCI for implementing the active communication protocol.

Moreover, the transmitting and receiving first antenna AT1 in each transponder Transp in the system is connected trough a transponder active receiver AMActRecT for receiving amplitude-modulated signals to a transponder logic circuit ActComm-ProtImplLCT for implementing the active communication protocol. Said logic circuit exchanges data with a memory device Mem. An output signal of the transponder logic circuit ActCommProtImplLCT for implementing the active communication protocol as a signal to be transmitted by the transmitter is conducted through a transponder active transmitter AMActTransmT for transmitting amplitude-modulated signals to a transmitting second transponder antenna AT2 for active communication.

Further, each transponder Transp is provided with a power supply circuit SupplC and a high-frequency signal generator.

The high-frequency signal generator in each transponder Transp can be embodied as a generator HFClGen generating a high-frequency signal and a clock signal. In this case, the interrogator Interrog may turn off its high-frequency signal generator HFGen after all transponders $Transp^{in}$ located within the interrogator passive working distance have transmitted their unique identification code.

And finally, the active communication protocol determines that the interrogator Interrog turns on its active receiver AMActRecI for receiving amplitude-modulated signals after the transponders $Transp^{in}$ located inside the interrogator passive working distance have transmitted their own unique identification code within the specified timeslot, and that, thereafter, each transponder $Transp^{out}$ located outside the interrogator passive working distance transmits its own unique identification code within the specified timeslot.

As described, the interrogator Interrog within the improved system acquires the unique identification code UID (unique identifier) from all transponders Transp, which are situated in its vicinity within the working distance as increased by the improvement according to the invention, i.e. the transponders $Transp^{in}$ located inside the interrogator passive working distance, and the transponders $Transp^{out}$ located outside said passive working distance but within the active working distance.

The passive communication protocol is preferably the protocol according to standard ISO 15693. The interrogator high-frequency signal generator HFGen and the transponder high-frequency signal generator generate a high-frequency signal having a frequency of 13.56 MHz.

The disclosed first embodiment of the radio frequency identification system of the invention for access control is compatible with systems of this kind, in which the communication follows the protocol subjected to the standard ISO 15693.

Variants of the first embodiment and of the second embodiment disclosed below have some features in common, which will be described after the disclosure of the basic variant of the second embodiment of the radio frequency identification system of the invention for access control.

The described known radio frequency identification system for access control is improved by the invention also in the following way to obtain the second embodiment of the radio frequency identification system of the invention (FIG. 3).

With respect to the presented known system, the interrogator Interrog is additionally provided with an interrogator logic circuit ActCommProtImplLCI for implementing the active communication protocol, which circuit exchanges data with the data interface DatInterf and transmits a signal to a interrogator frequency modulator FMI. An output signal of the interrogator frequency modulator FMI as a signal to be transmitted by the interrogator Interrog is conducted through the antenna matching transformer AMatchTransf to the transmitting and receiving first interrogator antenna AI1.

The interrogator Interrog is further provided with a receiving second interrogator antenna AI2 provided for active communication, which antenna is connected through an interrogator active receiver FMActRecI for receiving frequency-modulated signals to the interrogator logic circuit ActCommProtImplLCI for implementing the active communication protocol.

Further, the transmitting and receiving first antenna AT1 in each transponder Transp of the system is connected trough a transponder active receiver FMActRecT for receiving frequency-modulated signals to a transponder logic circuit ActCommProtImplLCT for implementing the active communication protocol. The transponder logic circuit ActCommProtImplLCT for implementing the active communication protocol exchanges data with the memory device Mem. Its output signal as a signal to be transmitted by the transmitter is conducted through a transponder active transmitter FMActTransmT for transmitting frequency-modulated signals to a transmitting second transponder antenna AT2 for the active communication.

Each transponder Transp is provided with a high-frequency signal generator and a power supply circuit SupplC.

The high-frequency signal generator in each transponder Transp can be realized as a generator HFClGen generating the high-frequency signal and the clock signal.

And finally, the active communication protocol determines that the interrogator Interrog turns on its active receiver FMActRecI for receiving frequency-modulated signals after the transponders $Transp^{in}$ located inside the interrogator passive working distance have transmitted their own unique identification code within the specified timeslot and, thereafter, each transponder $Transp^{out}$ located outside the interrogator passive working distance transmits its own unique identification code within the specified timeslot.

The interrogator logic circuit ActCommProtImplLCI for implementing the active communication protocol transmits a signal to the interrogator amplitude modulator AMI. The transmitting and receiving first antenna AT1 in each transponder Transp of the system is therefore connected trough a transponder active receiver AMActRecT for receiving amplitude-modulated signals to a transponder logic circuit ActComm-ProtImplLCT for implementing the active communication protocol.

Also in the second embodiment of the radio frequency identification system, the passive communication protocol is equally structured as the passive communication protocol subjected to the standard ISO 15693, uses the same set of commands and prevents collisions in the communication of the interrogator Interrog with the transponders $Transp^{in}$ and $Transp^{out}$ in the same way.

However, the interrogator high-frequency signal generator HFGen and the transponder high-frequency signal generator generate a high-frequency signal having frequency of 27 MHz or 40 MHz, and in no way exceeding 100 MHz.

In the continuation, some common features of the variants of the first and second embodiment of the radio frequency identification system for access control of the invention are described.

The active communication protocol in both embodiments is equally structured, uses the same set of commands and prevents collisions in the communication of the interrogator Interrog with the transponders Transp$^{in}$ located inside the interrogator passive working distance and the transponders Transp$^{out}$ located outside the interrogator passive working distance by means of the timeslots in the same way as the passive communication protocol subjected to the standard ISO 15693. It can be embodied in different ways, though.

Further, the active communication protocol may determine an additional identifier for a check point provided with access control.

In the transponder, the power supply circuit SupplC comprises a battery and a switch over circuit provided to select the energizing of transponder elements and may periodically turn off battery energizing of transponder elements. Thus the operating life of transponder battery becomes longer. In this case, after all transponders Transp$^{in}$ located within the interrogator passive working distance have presented themselves the interrogator Interrog must either so frequently keep transmitting the inventory request InvReq for the transponders Transp to present themselves that the inventory request occurs in the timeslots, in which battery energizing of the elements in the transponders Transp$^{out}$ located outside the interrogator passive working distance is turned on, or keep transmitting the inventory request InvReq for the transponders Transp to present themselves so long that the inventory request occurs in the timeslots, in which the battery energizing of the elements in the transponders Transp$^{out}$ located outside the interrogator passive working distance is turned on.

Especially, the transponders Transp$^{in}$ located within the interrogator passive working distance gain power to energize their elements from the magnetic field BItransm as transmitted by the receiving and transmitting first interrogator antenna AI1.

The interrogator logic circuits PassCommProtImplLCI and ActCommProtImplLCI for implementing the passive and active communication protocol, respectively, may be realized as a microcomputer provided with suitable programs. The same is true for the transponder logic circuits PassCommProtImplLCT and ActCommProtImplLCT for implementing the passive and active communication protocol, respectively.

Both the interrogator Interrog and each transponder Transp in the first and the second embodiments of the radio frequency identification system for access control of the invention in their represented preferred embodiments (FIGS. 2 and 3) are provided with two antennas each. Here the receiving second interrogator antenna AI2 is optimized to a good reception quality of a high-frequency signal, whereas the transmitting second transponder antenna AT2 is optimized to a good transmission quality of a high-frequency signal.

A cross talk between the interrogator antennas AI1 and AI2 as well as between the transponder antennas AT1 and AT2 is reduced by known precautions.

In the transponder Transp, the transmitting and receiving first antenna AT1 and the transmitting second antenna AT2 can be realized as a single optimized transmitting and receiving antenna. Also the transmitting and receiving first antenna AI1 and the receiving second antenna AI2 in the interrogator Interrog can be similarly realized as a single optimized transmitting and receiving antenna.

The invention claimed is:

1. Radio frequency identification system provided for access control and comprising
   an interrogator (Interrog),
   including a data interface (DatInterf) for exchanging data with
   an interrogator logic circuit (PassCommProtImplLCI) for implementing the passive communication protocol,
   said logic circuit transmits a signal to a first input of an interrogator amplitude modulator (AMI),
   said amplitude modulator having a second input for receiving an output signal of a high-frequency signal generator (HFGen) and for transmitting an output signal as a signal to be transmitted, conducted through an antenna matching transformer (AMatchTransf) to a transmitting and receiving first interrogator antenna (AI1), said first interrogator antenna conducing a received signal through the antenna matching transformer (AMatchTransf) and through an interrogator amplitude demodulator (ADemI) to the interrogator logic circuit (PassCommProtImplLCI) for implementing the passive communication protocol,
   and
   at least one transponder (Transp),
   including a transmitting and receiving first transponder antenna (AT1) connected through a transponder amplitude demodulator (ADemT) to a transponder logic circuit (Pass-CommProtImplLCT) for implementing the passive communication protocol,
   said transponder logic circuit exchanges data with a memory device (Mem) and
   provides an output signal as a signal to be transmitted and conducted through a transponder amplitude modulator (AMT) to the transmitting and receiving first transponder antenna (AT1),
   said antenna (ATI) connected to a rectifier (Rect) provided to supply energy to transponder elements and
   connected to a clock extractor (ClExtr) provided to extract a clock signal for the transponder elements out of a magnetic field (BItransm) transmitted by the interrogator,
   and
   the protocol for passive communication between the interrogator (Interrog) and the transponders (Transp),
   providing, inter alia,
   the interrogator (Interrog) turns on its high-frequency signal generator (HFGen) so that the transmitting and receiving first interrogator antenna (AI1) starts generating the magnetic field (BItransm) having a constant frequency,
   a time interval ($\Delta$t) thereafter, the interrogator (Interrog) transmits an inventory request (InvReq)
   that the transponders (Transp$^{in}$) located within an interrogator passive working distance shall present themselves,
   within a specified timeslot thereafter, each transponder (Transp$^{in}$) located within the interrogator passive working distance transmits its own unique identification code,
   characterized in
   that the interrogator (Interrog) is provided with an interrogator logic circuit (ActCommProtImplLCI) for implementing the active communication protocol,
   said logic circuit exchanges data with the data interface (DatInterf) and
   transmits a signal to the interrogator amplitude modulator (AMI),
   whose output signal as a signal to be transmitted is conducted through the antenna matching transformer (AMatchTransf) to the transmitting and receiving first interrogator antenna (AI1),
   that the interrogator (Interrog) is provided with a receiving second interrogator antenna (AI2) provided for active communication and with reduced cross-talk with the first interrogator antenna (AI1), said second interrogator antenna is connected through an interrogator active receiver (AMActRecI) for receiving amplitude-modulated signals to the interrogator logic circuit (Act-CommProtImplLCI) for implementing the active communication protocol, wherein the transmitting and receiving first antenna (AT1) in each transponder (Transp) of the system is connected through a transponder active receiver (AMActRecT) for receiving amplitude-modulated signals to a transponder logic circuit (ActCommProtImplLCT) for implementing the active communication protocol, said logic circuit exchanges data with a memory device (Mem) and whose output signal as a signal to be transmitted by the transmitter is conducted through a transponder active transmitter (AMActTransmT) for transmitting amplitude-modulated signals to a transmitting second transponder antenna (AT2) for the active communication, wherein each transponder (Transp) is provided with a high-frequency signal generator, and each transponder (Transp) is provided with a power supply circuit (SupplC), and wherein the logic for the active communication protocol determines that the interrogator (Interrog) turns on its active receiver (AMActRecI) for receiving amplitude-modulated signals only after the transponders (Transp$^{in}$) located within the interrogator passive working distance have transmitted their own unique identification code within a specified timeslot, and thereafter, each transponder (Transp$^{out}$) located outside the interrogator passive working distance transmits its own unique identification code within a specified timeslot.

2. Radio frequency identification system provided for access control as recited in claim 1, characterized in that the passive communication protocol is a protocol according to standard ISO 15693 and the interrogator high-frequency signal generator (HFGen) and the transponder high-frequency signal generator generate a high-frequency signal having a frequency of 13.56 MHz.

3. Radio frequency identification system provided for access control as recited in claim 2, characterized in that the active communication protocol is structured like the passive communication protocol subjected to standard ISO 15693, uses the same set of commands and, by means of the timeslots, prevents collisions in the communication of the interrogator (Interrog) with the transponders (Transp$^{in}$) located within the interrogator passive working distance and the transponders (Transp$^{out}$) located outside the interrogator passive working distance.

4. Radio frequency identification system provided for access control as recited in claim 3, characterized in that the active communication protocol provides an additional identifier for a check point provided with access control.

5. Radio frequency identification system provided for access control as recited in claim 4, characterized in that the transponder power supply circuit (SupplC) comprises a battery and a switch over circuit used to select the energizing of transponder elements.

6. Radio frequency identification system provided for access control as recited in claim 5, characterized in that the transponder power supply circuit (SupplC) periodically turns off the battery energizing of transponder elements.

7. Radio frequency identification system provided for access control as recited in claim 6, characterized in that after all transponders (Transp$^{in}$) located within the interrogator passive working distance have presented themselves the interrogator (Interrog) so frequently repeats transmitting the inventory request (InvReq) to present the transponders (Transp) themselves that the inventory request will occur in the timeslots, in which the battery energizing of the elements in the transponders (Transp$^{out}$) located outside the interrogator passive working distance is turned on.

8. Radio frequency identification system provided for access control as recited in claim 6, characterized in that after all transponders (Transp$^{in}$) located within the interrogator passive working distance have presented themselves the interrogator (Interrog) keeps transmitting the inventory request (InvReq) for the transponders (Transp) to present themselves for so long as the inventory request occurs in the timeslots, in which the battery energizing of the elements in the transponders (Transp$^{out}$) located outside the interrogator passive working distance is turned on.

9. Radio frequency identification system provided for access control as recited in claim 1, characterized in that the high-frequency signal generator in each transponder (Transp) is embodied as a generator (HFClGen) generating a high-frequency signal and a clock signal, and that the interrogator (Interrog) turns off its high-frequency signal generator (HFGen)

after all transponders (Transp$^{in}$) located within the interrogator passive working distance have transmitted their unique identification code.

10. Radio frequency identification system provided for access control as recited in claim 1, characterized in that the interrogator logic circuits (PassCommProtImplLCI, ActCommProtImplLCI) for implementing the passive and active communication protocol, respectively, are realized as a microcomputer provided with suitable programs and that the transponder logic circuits (PassCommProtImplLCT, ActCommProtImplLCT) for implementing the passive and active communication protocol, respectively, are realized as a microcomputer provided with suitable programs.

11. Radio frequency identification system provided for access control as recited in claim 1, characterized in that the transmitting and receiving first antenna (AT1) and the transmitting second antenna (AT2) in each transponder (Transp) are realized as a single optimized transmitting and receiving antenna.

12. Radio frequency identification system provided for access control as recited in claim 1, characterized in that the transmitting and receiving first antenna (AI1) and the receiving second antenna (AI2) in the interrogator (Interrog) are realized as a single optimized transmitting and receiving antenna.

13. Radio frequency identification system provided for access control and comprising an interrogator (Interrog), including a data interface (DatInterf) for exchanging data with an interrogator logic circuit (PassCommProtImplLCI) for implementing the passive communication protocol said logic circuit transmits a signal to a first input of an interrogator amplitude modulator (AMI), said amplitude monitor having a second input for receiving an output signal of a high-frequency signal generator (HFGen) and for transmitting an output signal as a signal to be transmitted conducted through an antenna matching transformer (AMatchTransf) to a transmitting and receiving first interrogator antenna (AI1), said first interrogator antenna contacting a received signal through the antenna matching transformer (AMatchTransf) and through an interrogator amplitude demodulator (ADemI) to the interrogator logic circuit (PassCommProtImplLCI) for implementing the passive communication protocol, and at least one transponder (Transp), including a transmitting and receiving first transponder antenna (AT1) connected through a transponder amplitude demodulator (ADemT) to a transponder logic circuit (Pass-CommProtImplLCT) for implementing the passive communication protocol, said transponder logic circuit exchanges data with a memory device (Mem) and provides an output signal as a signal to be transmitted and conducted through a transponder amplitude modulator (AMT) to the transmitting and receiving first transponder antenna (AT1), said antenna (AT1)

connected to a rectifier (Rect) provided to supply energy to transponder elements and connected to a clock extractor (ClExtr) provided to extract a clock signal for the transponder elements out of a magnetic field (BItransm) transmitted by the interrogator, and the protocol for the passive communication between the interrogator (Interrog) and the transponders (Transp), providing, inter alia, the interrogator (Interrog) turns on its high-frequency signal generator (HFGen) so that the transmitting and receiving first interrogator antenna (AI1) starts generating the magnetic field (BItransm) having a constant frequency, a time interval (Δt) thereafter, the interrogator (Interrog) transmits an inventory request (InvReq)

that transponders (Transp$^{in}$) located within an interrogator passive working distance shall present themselves, within a specified timeslot thereafter, each transponder (Transp$^{in}$) located within the interrogator passive working distance transmits its own unique identification code, characterized in that the interrogator (Interrog) is provided with an interrogator logic circuit (Act-CommProtImplLCI) for implementing the active communication protocol, said logic circuit exchanges data with the data interface (DatInterf) and transmits a signal to an interrogator frequency modulator (FMI), whose output signal as a signal to be transmitted is conducted through the antenna matching transformer (AMatchTransf) to the transmitting and receiving first interrogator antenna (AI1), that the interrogator (Interrog) is provided with a receiving second interrogator antenna (AI2) provided for the active communication and with reduced cross-talk with the first interrogator antenna (AI1), said second interrogator antenna is connected through an interrogator active receiver (FMActRecI) for receiving frequency-modulated signals to the interrogator logic circuit (ActCommProtImplLCI) for implementing the active communication protocol, wherein the transmitting and receiving first antenna (AT1) in each transponder (Transp) of the system is connected through a transponder active receiver (FMActRecT) for receiving frequency-modulated signals to a transponder logic circuit (ActCommProtImplLCT) for implementing the active communication protocol, said logic circuit exchanges data with the memory device (Mem) and whose output signal as a signal to be transmitted by the transmitter is conducted through a transponder active transmitter (FMActTransmT) for transmitting frequency-modulated signals to a transmitting second transponder antenna (AT2) for active communication, wherein each transponder (Transp) is provided with a high-frequency signal generator, wherein each transponder (Transp) is provided with a power supply circuit (SupplC), and wherein the active communication protocol determines that the interrogator (Interrog) turns on its active receiver (FMActRecI) for receiving frequency-modulated signals only after the transponders (Transp$^{in}$) located within the interrogator passive working distance have transmitted their own unique identification code within a specified timeslot, and thereafter, each transponder (Transp$^{out}$) located outside the interrogator passive working distance transmits its own unique identification code within a specified timeslot.

14. Radio frequency identification system provided for access control as recited in claim 13, characterized in that the interrogator logic circuit (ActCommProtImplLCI) for implementing the active communication protocol transmits a signal to the interrogator amplitude modulator (AMI)

and that transmitting and receiving first antenna (AT1) in each transponder (Transp) of the system is connected through a transponder active receiver (AMActRecT) for receiving amplitude-modulated signals to a transponder logic circuit (ActCommProtImplLCT) for implementing the active communication protocol.

15. Radio frequency identification system provided for access control as recited in claim 13, characterized in that the active communication protocol and the passive communication protocol are equally structured, use the same set of commands and prevent collisions in the communication of the interrogator (Interrog) with the transponders (Transp$^{in}$) located within the interrogator passive working distance and the transponders (Transp$^{out}$) located outside the interrogator passive working distance by means of to present timeslots in the same way as passive communication protocol subjected to standard ISO 15693.

16. Radio frequency identification system provided for access control as recited in claim 15, characterized in that the interrogator high-frequency signal generator (HFGen) and the transponder high-frequency signal generator generate a high-frequency signal having a frequency of 27 MHz.

17. Radio frequency identification system provided for access control as recited in claim 15, characterized in that the interrogator high-frequency signal generator (HFGen) and the transponder high-frequency signal generator generate a high-frequency signal having a frequency of 40 MHz.

18. Radio frequency identification system provided for access control as recited in claim 15, characterized in that the interrogator high-frequency signal generator (HFGen) and the transponder high-frequency signal generator generate a high-frequency signal having a frequency lying below 100 MHz.

19. Radio frequency identification system provided for access control as recited in claim 16, characterized in that the active communication protocol determines an additional identifier for a check point provided with access control.

20. Radio frequency identification system provided for access control as recited in claim 19, characterized in that the transponder power supply circuit (SupplC) comprises a battery and a switch over circuit provided to select energizing of transponder elements.

21. Radio frequency identification system provided for access control as recited in claim 20, characterized in that the transponder power supply circuit (SupplC) periodically turns off the battery energizing of transponder elements.

22. Radio frequency identification system provided for access control as recited in claim 21, characterized in that after all transponders (Transp$^{in}$) located within the interrogator passive working distance have presented themselves the interrogator (Interrog) keeps transmitting the inventory request (InvReq) for the transponders (Transp) to present themselves so frequently that the inventory request occurs in the timeslots, in which the battery energizing of the elements in the transponders (Transp$^{out}$) located outside the interrogator passive working distance is turned on.

23. Radio frequency identification system provided for access control as recited in claim 21, characterized in that after all transponders (Transp$^{in}$) located within the interrogator passive working distance have presented themselves the interrogator (Interrog) keeps transmitting the inventory request (InvReq) for the transponders (Transp) to present themselves so long that the inventory request occurs in the timeslots, in which the battery energizing of the elements in the transponders (Transp$^{out}$) located outside the interrogator passive working distance is turned on.

24. Radio frequency identification system provided for access control as recited in claim 13, characterized in that the high-frequency signal generator in each transponder (Transp) is made as a generator (HFClGen) generating a high-frequency signal and a clock signal.

25. Radio frequency identification system provided for access control as recited in claim 13, characterized in that the interrogator logic circuits (PassCommProtImplLCI, ActCommProtImplLCl) for implementing the passive and active communication protocol, respectively, are realized as a microcomputer provided with suitable programs and that the transponder logic circuits (PassCommProtImplLCT, ActCommProtImplLCT) for implementing the passive and active communication protocol, respectively, are realized as a microcomputer provided with suitable programs.

26. Radio frequency identification system provided for access control as recited in claim 13, characterized in that the transmitting and receiving first antenna (AT1) and the transmitting second antenna (AT2) in each transponder (Transp) are realized as a single optimized transmitting and receiving antenna.

27. Radio frequency identification system provided for access control as recited in claim 13, characterized in that the transmitting and receiving first antenna (AI1) and the receiving second antenna (AI2) in the interrogator (Interrog) are realized as a single optimized transmitting and receiving antenna.

28. Radio frequency identification system provided for access control as recited in claim 1, wherein the interrogator (Interrog) turns off its high-frequency signal generator (HFGen) after all transponders (Transp$^{in}$) located within the interrogator passive working distance have transmitted their unique identification code.

29. Radio frequency identification system provided for access control as recited in claim 13, wherein the interrogator (Interrog) turns off its high-frequency signal generator (HFGen) after all transponders (Transp$^{in}$) located within the interrogator passive working distance have transmitted their unique identification code.

* * * * *